(12) United States Patent
Beck et al.

(10) Patent No.: US 11,028,781 B2
(45) Date of Patent: Jun. 8, 2021

(54) DISENGAGEABLE SPEED-REDUCING UNIT

(71) Applicant: SAFRAN TRANSMISSION SYSTEMS, Colombes (FR)

(72) Inventors: Guillaume Julien Beck, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/607,225

(22) PCT Filed: May 2, 2018

(86) PCT No.: PCT/FR2018/051084
§ 371 (c)(1),
(2) Date: Oct. 22, 2019

(87) PCT Pub. No.: WO2018/202990
PCT Pub. Date: Nov. 8, 2018

(65) Prior Publication Data
US 2020/0378309 A1 Dec. 3, 2020

(30) Foreign Application Priority Data
May 4, 2017 (FR) ..................................... 17 53956

(51) Int. Cl.
*F16H 35/10* (2006.01)
*F16H 57/08* (2006.01)
(Continued)

(52) U.S. Cl.
CPC ............... *F02C 7/36* (2013.01); *F16H 55/17* (2013.01); *F16H 57/08* (2013.01);
(Continued)

(58) Field of Classification Search
CPC ............... F16H 35/10; F16H 2035/103; F16H 2035/106; F16H 57/023
(Continued)

(56) References Cited

U.S. PATENT DOCUMENTS 1,925,943 A * 9/1933 Stein ........................ F16H 35/10
74/7 C
2,926,550 A * 3/1960 Stoeckicht ............. B63H 23/12
475/1

(Continued)

FOREIGN PATENT DOCUMENTS

CN 103192241 A 7/2013
EP 0 090 326 A1 10/1983
(Continued)

OTHER PUBLICATIONS

International Search Report dated Jul. 20, 2018 in PCT/FR2018/051084 filed on May 2, 2018.
(Continued)

*Primary Examiner* — Sherry L Estremsky
(74) *Attorney, Agent, or Firm* — Oblon, McClelland, Maier & Neustadt, L.L.P.

(57) ABSTRACT

A speed-reducing unit, particularly for transferring torque between a gas turbine and a fan in a turbine engine, includes an annular ring, at least one gear that is coupled to the ring, the ring including two annular half-rings that are offset relative to each other along the main axis of the speed-reducing unit and that are coupled with at least one gear, and a plate for supporting the two half-rings, in relation to which the two half-rings are rotationally fixed about the main axis of the speed-reducing unit. Each half-ring includes an internal helical tooth. Each half-ring is connected to the support plate so as to be able to be uncoupled from at least one gear when at least one gear exerts a disengaging action on each
(Continued)

half-ring, with the amplitude of the action being greater than a determined amplitude value.

14 Claims, 5 Drawing Sheets

(51) Int. Cl.
*F02C 7/36* (2006.01)
*F16H 55/17* (2006.01)

(52) U.S. Cl.
CPC .... *F05D 2220/323* (2013.01); *F05D 2220/36* (2013.01); *F05D 2240/52* (2013.01); *F16H 2055/176* (2013.01)

(58) Field of Classification Search
USPC .................................................. 475/263, 299
See application file for complete search history.

(56) References Cited

U.S. PATENT DOCUMENTS

| | | | | |
|---|---|---|---|---|
| 3,459,072 A | * | 8/1969 | Forrest | F16H 1/2818 475/344 |
| 5,071,397 A | * | 12/1991 | Grimm | B64C 13/341 475/263 |
| 6,852,063 B2 | * | 2/2005 | Takahashi | F02N 11/003 477/5 |
| 7,220,205 B2 | * | 5/2007 | Nagai | F16H 3/54 475/91 |
| 10,399,669 B2 | * | 9/2019 | Viennot | B64C 13/34 |
| 2013/0225353 A1 | | 8/2013 | Gallet et al. | |
| 2015/0300255 A1 | | 10/2015 | Gallet et al. | |
| 2016/0097331 A1 | * | 4/2016 | Venter | F16C 27/045 415/122.1 |

FOREIGN PATENT DOCUMENTS

| | | | | |
|---|---|---|---|---|
| GB | 784573 A | * | 10/1957 | F16H 3/005 |
| WO | WO 2013/124590 A1 | | 8/2013 | |
| WO | WO 2017/129926 A1 | | 8/2017 | |

OTHER PUBLICATIONS

French Preliminary Search Report dated Jan. 18, 2018 in French Application 17 53956 filed on May 4, 2017.

* cited by examiner

DISENGAGEABLE SPEED-REDUCING UNIT

TECHNICAL FIELD

The invention relates to a speed reducer for an aircraft turbomachine which includes so-called fusible means enabling elements connected with the reducer to be uncoupled.

The invention more particularly relates to a speed reducer for a driving torque transmission between a shaft of the low pressure turbine and the fan of the turbomachine which is of the planet gearset type which includes said fusible means.

State of Prior Art

In an aircraft turbomachine, the low pressure shaft of the turbomachine, which connects the low pressure turbine with the low pressure compressor, is also connected to a fan of the turbomachine.

A reducer is interposed between the low pressure shaft and the fan, to perform a rotation speed reduction. Conventionally, the reducer is a planet gearset reducer including a central sun gear coupled with the low pressure shaft and a planet carrier which is coupled with the fan.

The external ring gear is fixed and is connected to a case of the turbomachine.

In use, some parts of the low pressure line which has just been defined previously can be blocked, thus blocking the reducer. It is for example the case during the bearing drag of planet gears connecting each planet gear to the planet carrier, a foreign body ingestion or blocking or braking in the low pressure line, caused by a vane break for example.

Such a blocking of a part of the system can cause another part of this system to be ruptured, and thus cause fan blocking, thus resulting in an increase in the turbomachine drag and being detrimental to the aircraft controllability.

To prevent the reducer from having such a blocking, it has been suggested to incorporate in the low pressure line one or more safety devices which are ruptured in case of blocking.

Such safety devices, commonly called fusible devices, can be placed at any place in the low pressure line.

However, the design of these fusible devices is difficult to made as well as to implement since the introduction of such elements in the low pressure line amounts to introducing in the line one or more flexible zones, being thus detrimental to the dynamic behaviour of the line.

The purpose of the invention is to provide a speed reducer which enables the mechanical fuse function to be ensured without introducing a flexible zone in the low pressure line.

DISCLOSURE OF THE INVENTION

The invention provides a speed reducer in particular for torque transmission between a gas turbine and a fan in a turbomachine, including an annular ring gear coaxial to a main axis of the speed reducer and having radially inner teeth, at least one gear which is coupled with the ring gear and which includes radially outer teeth complementary to the teeth of the annular ring gear, wherein the ring gear includes two annular half-ring gears offset with respect to each other along the main axis of the speed reducer and which are coupled with said at least one gear, and a support plate for supporting both half-ring gears with respect to which both half-ring gears are rotatably immovable about the main axis of the speed reducer, each half-ring gear including helical inner teeth tilted in a direction opposite to the tilt direction of the teeth of the other half-ring gear, characterised in that each half-ring gear is connected to the support plate so as to be able to be uncoupled from said at least one gear when said at least one gear exerts on each half-ring gear an unclutching action the amplitude of which is higher than a determined amplitude value.

The connection of the half-ring gears between each other and with the support plate enables the mechanical fuse function to be ensured while allowing a rigid system when the half-ring gears are integral with each other. Therefore, there is no flexible zone induced by this solution.

Preferably, each half-ring gear is slidably mounted with respect to the support plate, along a direction parallel to the main axis of the speed reducer, between a coupled position in which said half-ring gear is coupled with said at least one gear and an uncoupled position in which said half-ring gear is uncoupled from said at least one gear, and the speed reducer includes retaining means for retaining said half-ring gear in its coupled position, said retaining means being able to be disengaged to enable said half-ring gear to be moved to the uncoupled position when said at least one gear exerts on each half-ring gear said unclutching action.

Preferably, the retaining means include at least one abutting member associated with each half-ring gear, which axially abuts against an abutting face of the half-ring gear associated therewith, and which is able to change state when said at least one gear exerts on the half-ring gear said unclutching action.

Preferably, the abutting member consists of a deformable stop ring associated with each half-ring gear, which abuts against said abutting face of the half-ring gear associated therewith and which is carried by a rod oriented parallel to the main axis of the speed reducer and which passes through an axial port made in both half-ring gears.

Preferably, the abutting member includes a fusible thrust bearing which is able to be ruptured when said at least one gear exerts on the half-ring gear said action.

Preferably, the fusible thrust bearing includes an attachment portion for attaching the fusible thrust bearing to the support plate and an abutting portion for abutting the fusible thrust bearing against said abutting face of the half-ring gear.

Preferably, the retaining means include a thrust bearing member associated with each half-ring gear, which is able to cooperate with the associated half-ring gear when it is in its uncoupled position.

Preferably, the thrust bearing member includes a washer received in an associated groove formed in one end of the rod associated with said half-ring gear.

Preferably, the thrust bearing member includes at least one ball thrust bearing arranged in a spline of the support plate which is able to cooperate with the associated half-ring gear when it is in one of the uncoupled position and the coupled position.

Preferably, each half-ring gear is movably driven to its uncoupled position through the axial force resulting from the action of said at least one gear on the helical teeth of the half-ring gear.

Preferably, the speed reducer includes further means for movably driving each half-ring gear to its uncoupled position.

Preferably, said further driving means include a compression spring which is axially compressed between both half-ring.

Preferably, the speed reducer consists of a planetary gearset type reducer and said ring gear is the outer annular ring gear of the gearset and said at least one gear consists of a plurality of planet gears connected to each other by a planet carrier.

The invention also relates to an aircraft turbomachine including a low pressure turbine, a low pressure shaft which is coupled with the low pressure turbine and a fan which is coupled with the low pressure shaft, characterised in that it includes a speed reducer according to the invention, through which the fan is coupled with the low pressure shaft.

BRIEF DESCRIPTION OF THE DRAWINGS

Further characteristics and advantages of the invention will appear upon reading the detailed description that follows for the understanding of which the appended figures will be referred to in which.

DETAILED DISCLOSURE OF PARTICULAR EMBODIMENTS

Figure 1:
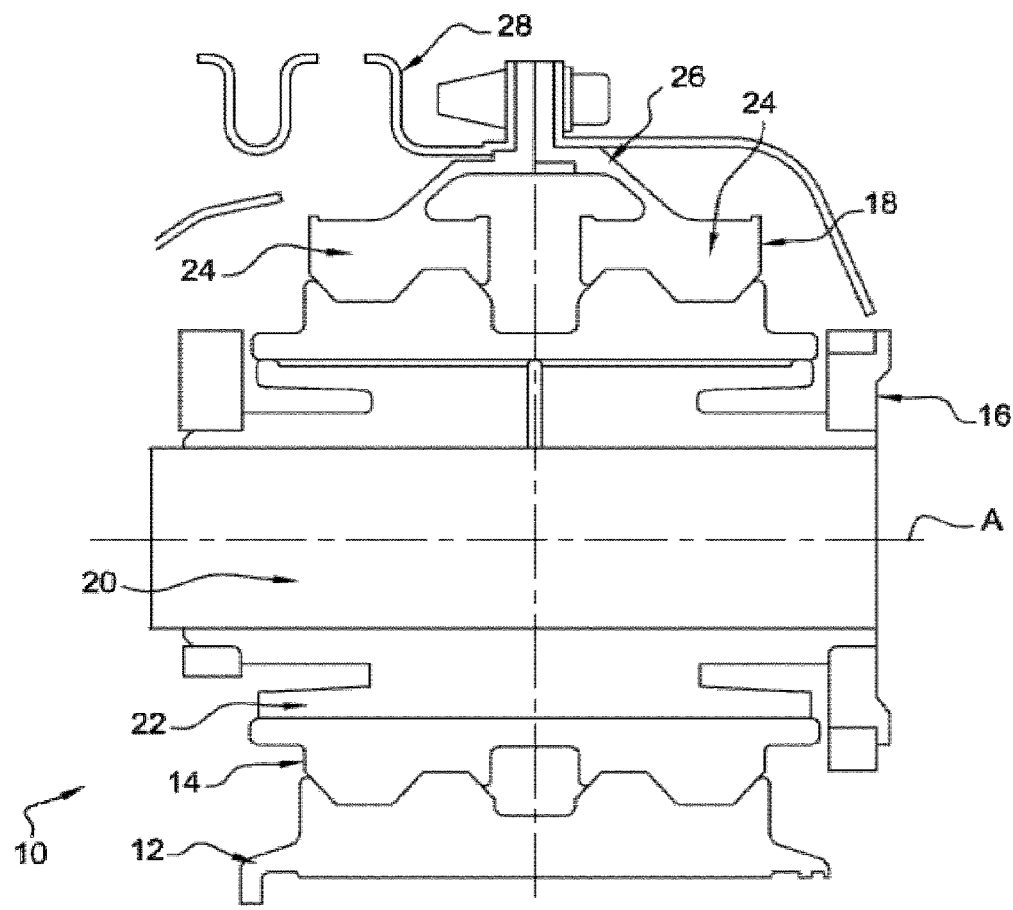
FIG. 1 is a partial axial cross-section view of a speed reducer of the planet gearset type according to prior art.

In FIG. 1, a speed reducer 10 is represented, which is for being mounted in an aircraft turbomachine for connecting a low pressure shaft of the turbomachine to a fan of the turbomachine.

The speed reducer 10 is of the planetary gearset type. It includes a central planet gear 12, a plurality of planet gears 14, only one planet gear 14 of which is represented in FIG. 1, a planet carrier 16 on which the planet gears 14 are rotatably mounted and an annular toothed ring gear 18.

The planet gear 12 is coaxial to a main axis of the speed reducer 10, it is coupled with each planet gear 14.

Each planet gear 14 is rotatably movable with respect to the planet carrier 16 about an axis A parallel to the main axis of the speed reducer 10. The planet carrier 16 includes several axes 20 to that end, each axis 20 of which is associated with a planet gear 14 and which performs rotatable guiding of the planet gear 14 with respect to the planet carrier 16.

A bearing 22 is disposed between the planet gear 14 and the associated axis 20 to limit friction between both elements. It will be understood that any type of bearing 22, or any other guiding means can be used between the planet gear 14 and the axis 20 without departing from the field of the invention.

Thus, each planet gear 14 is coupled both with the planet gear 12 and the ring gear 18.

To that end, the ring gear 18 includes teeth on its radially inner face for being coupled with each planet gear 14. To that end, the planet gears 14 include complementary teeth.

The teeth in the speed reducer 10 are further designed not to generate axial stresses in the speed reducer 10, nor on the elements to which the speed reducer 10 is connected.

Figure 2:
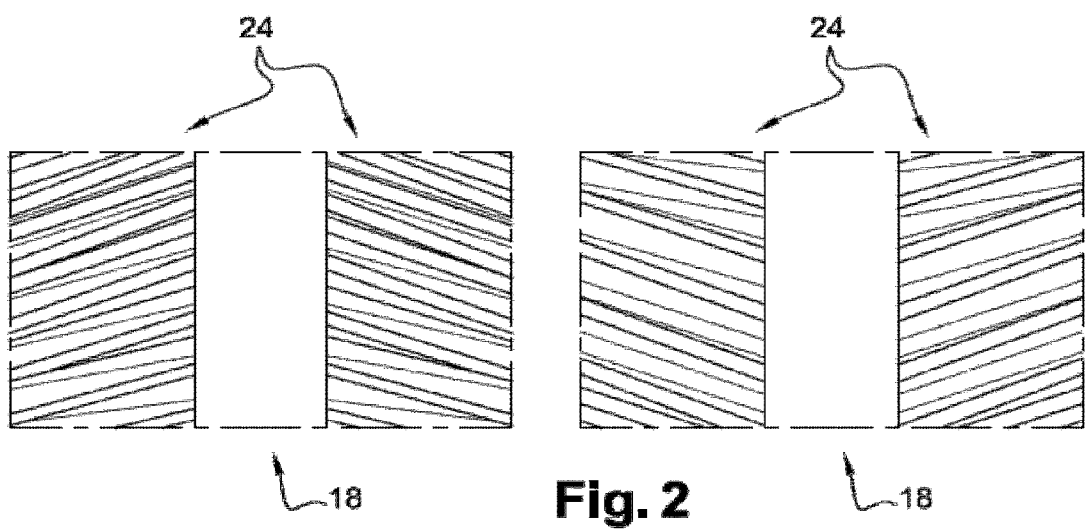
FIG. 2 is a schematic representation of a part of the toothed inner annular face of the half-ring gears represented in FIG. 1, showing two possible orientations of their helical teeth.

As can be seen in FIG. 2, the teeth in the reducer are herein herring-bone teeth or "V" teeth.

The ring gear 18 further consists of two half-ring gears 24 which are annular, coaxial to the main axis of the speed reducer and which are offset with respect to each other along the main axis of the reducer.

Both half-ring gears 24 are connected to each other through a support plate 26. The support plate 26 is itself connected to a fixed case 28 of the turbomachine.

Each half-ring gear 24 includes, on its inner annular face, helical teeth. The tilt of the teeth of a half-ring gear is opposed to the tilt of the teeth of the other half-ring gear 24. Thus, as can be seen in FIG. 2, the pattern formed by both teeth is V-shaped, thus naming this teeth type.

Each planet gear 14 meshes with the ring gear 18. Consequently, the teeth of each planet gear 14 are herring-bone teeth complementary to the teeth of the ring gear 18.

Thus, each planet gear 14 meshes with the planet gear 12, the teeth of the planet gear 12 are thus also herring-bone teeth complementary to the teeth of the planet gears 14.

Each planet gear 14 exerts on each half-ring gear 24 an action decomposed into a tangential force, an axial force oriented parallel to the main axis of the speed reducer 10 and a force radially oriented with respect to the main axis A of the planet gear 14.

The direction of the axial force on a half-ring gear is defined as a function of the orientation of the teeth of the half-ring gear 24. Thus, as can be seen in FIG. 2, for a tangential force exerted by the planet gear 14 on each half-ring gear 24, which is oriented downwardly in the figure, the axial force on each half-ring gear 24 is oriented outwardly of the ring gear 18 on the left view and it is oriented inwardly of the ring gear 14 on the right view.

Figure 3:
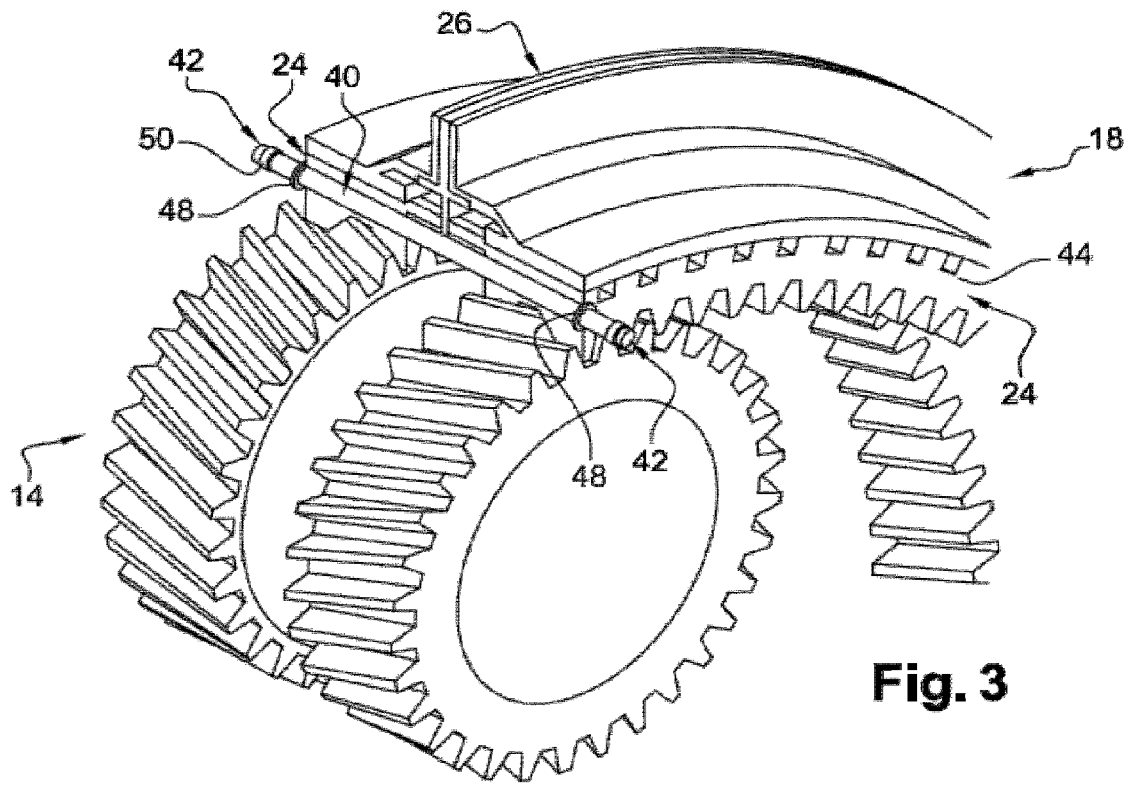
FIG. 3 is a broken schematic representation of a first embodiment of a speed reducer according to the invention.

Two embodiments of a speed reducer 10 which includes unclutching means enabling an uncoupling of the planet gears 14 from the half-ring gears 24 to be made have been represented in FIG. 3.

This unclutching is planned to occur when the planet gears exert on the half-ring gears 24 an action the amplitude of which is higher than a predefined amplitude value and for which the direction of the axial force is oriented outwardly of the reducer 10. In the description that follows, this action causing unclutching will be called an unclutching action.

Thus, when the planet gears exert on the half-ring gears 24 the unclutching action, the value of the axial force exerted by the planet gears 14 on the half-ring gears 24 becomes higher than a predefined force value.

Preferably, the amplitude of the unclutching action is determined to correspond to a blocking of a component in the turbomachine, which is connected with the speed reducer 10 or of a component of the speed reducer 10.

This blocking can be made at a bearing 22, in a low pressure stage of the turbomachine or in the fan of the turbomachine.

Thus, by providing unclutching of the speed reducer 10, the blocking of one of these components will not be detrimental to the integrity of the other components nor to the controllability of the aircraft on which the speed reducer 10 is mounted.

The unclutching of the speed reducer 10 consists in axially sliding both half-ring gears 24 and by moving them away from each other such that they are no longer coupled with the planet gears 14.

Figure 4A:
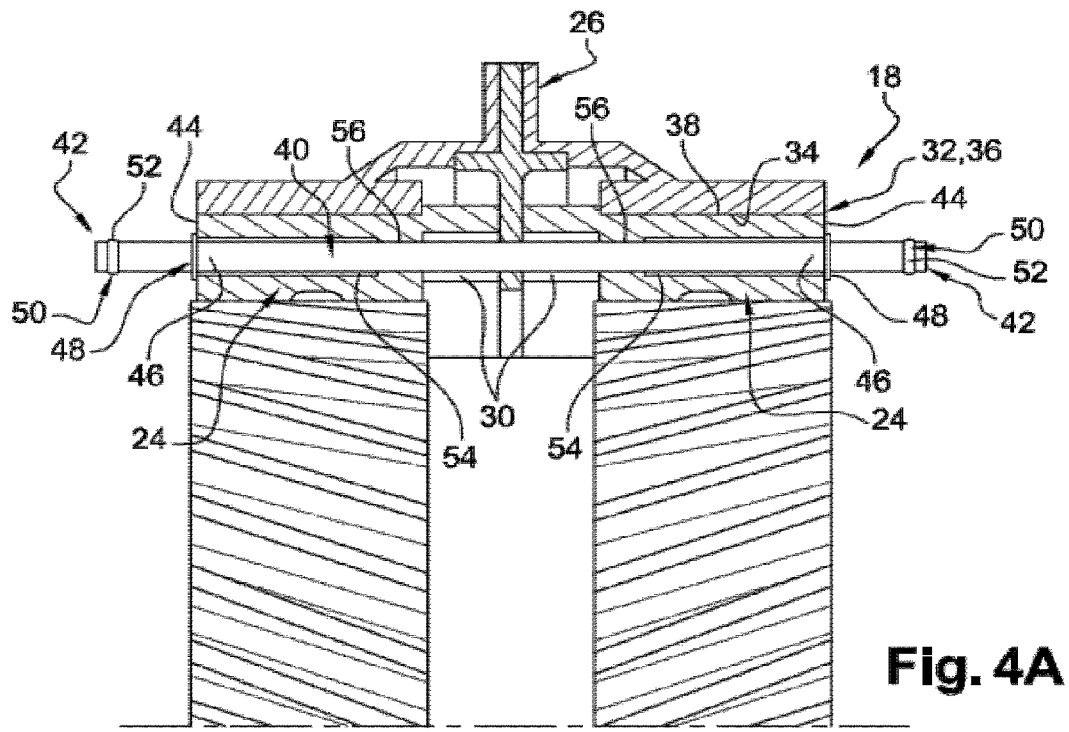
FIGS. 4A to 4C are axial cross-sections of the speed reducer represented in FIG. 3, showing different states of the reducer.
Figure 4B:
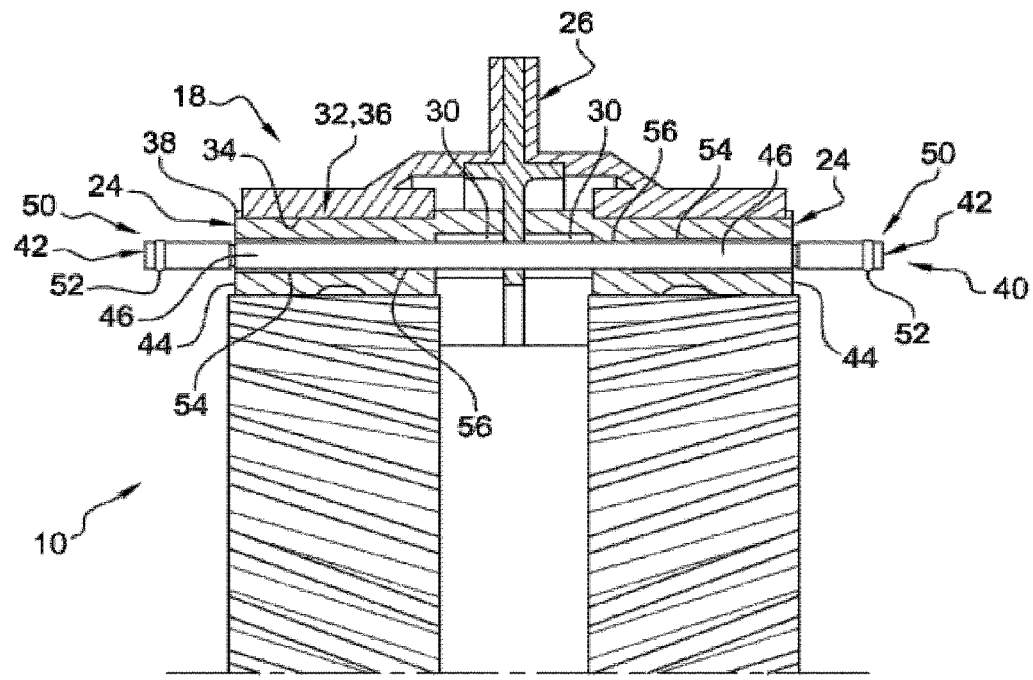
Figure 4C:
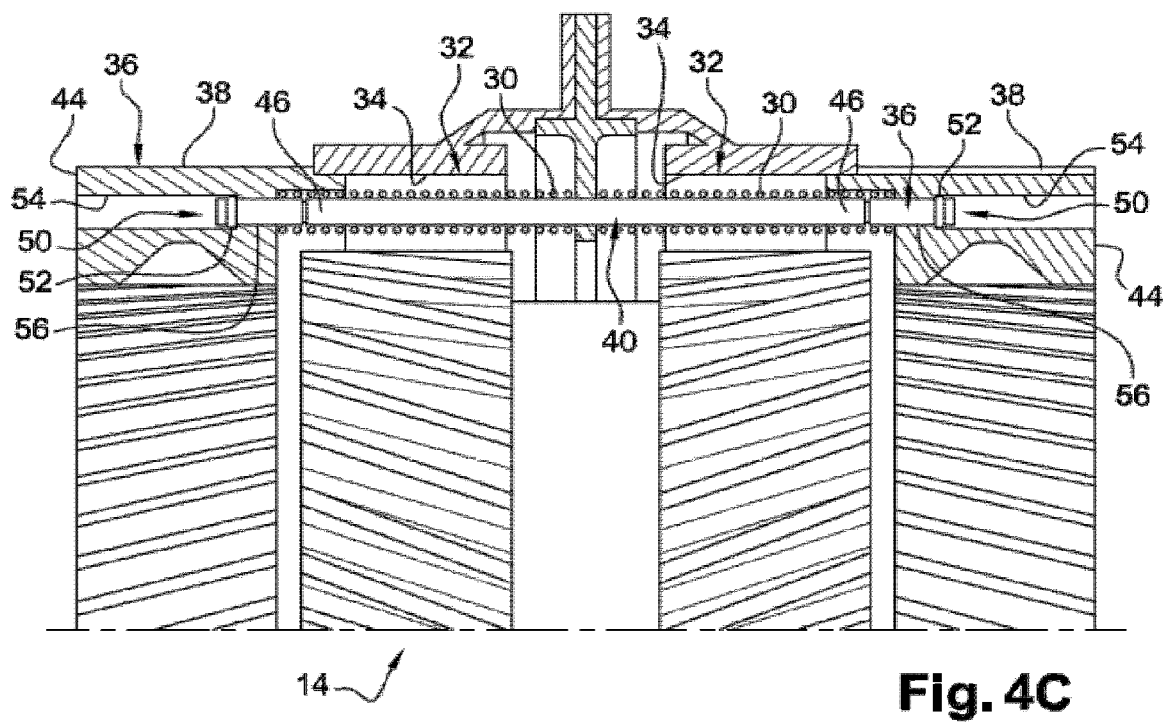
Figure 5:
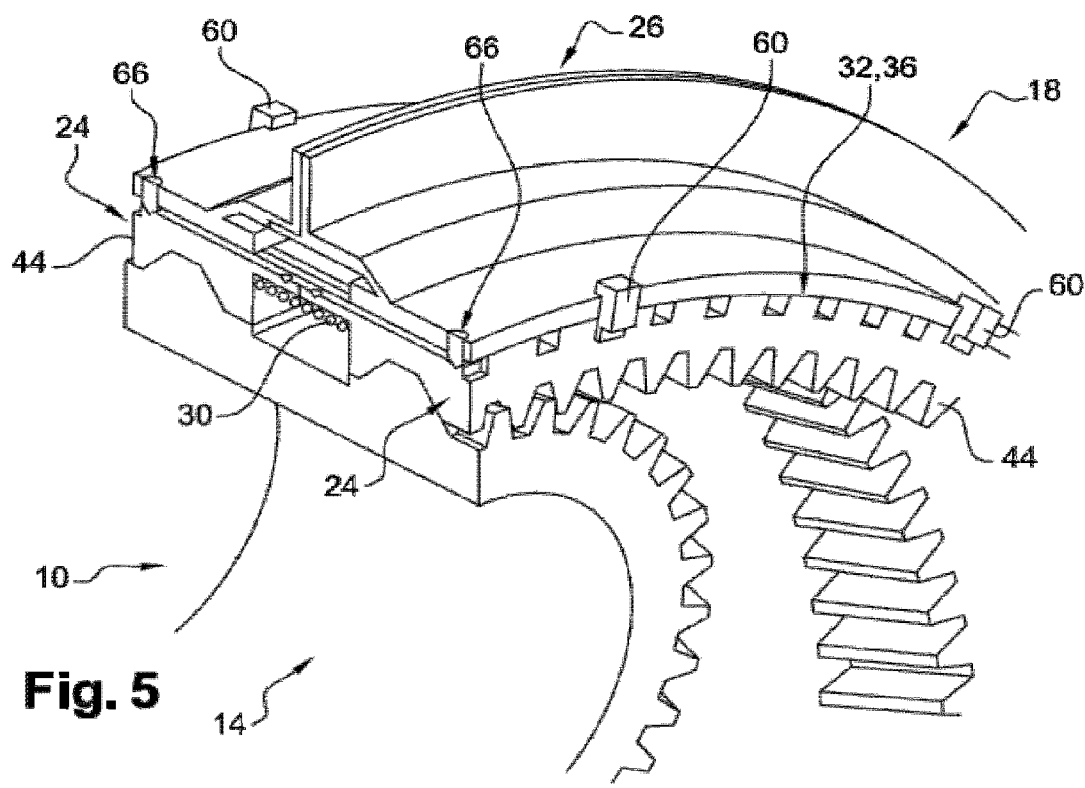
FIG. 5 is a broken schematic representation of a second embodiment of a speed reducer according to the invention.
Figure 6A:
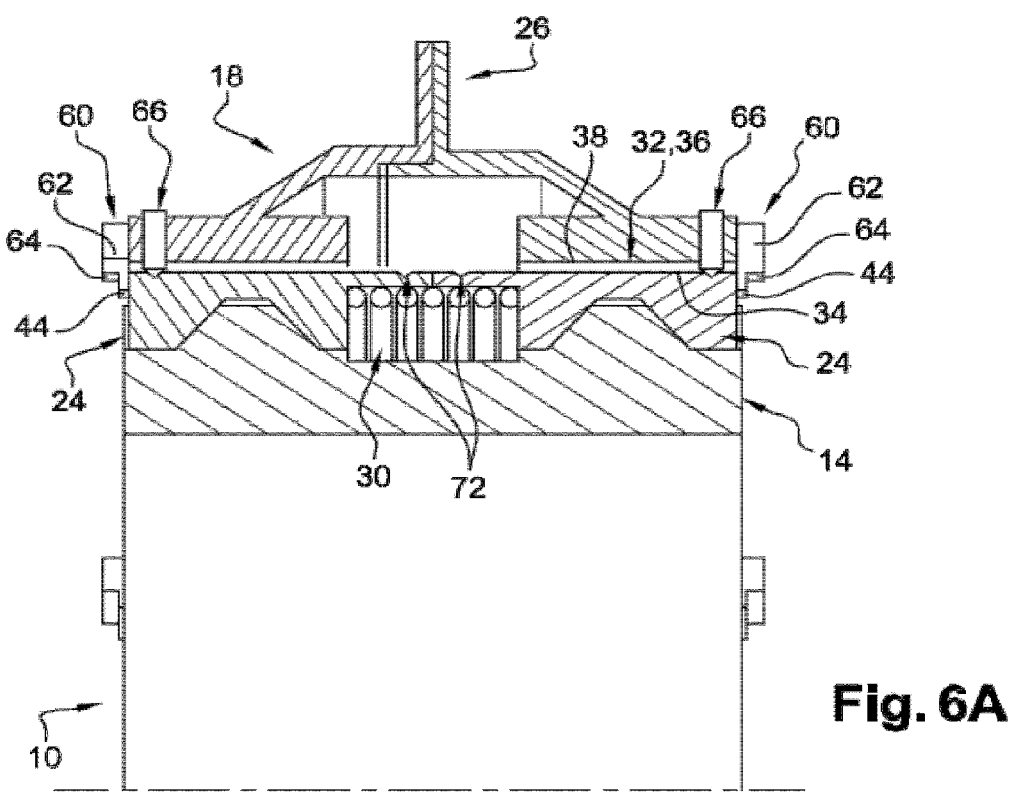
FIGS. 6A to 6C are axial cross-sections of the speed reducer represented in FIG. 5, showing different states of the reducer.
Figure 6B:
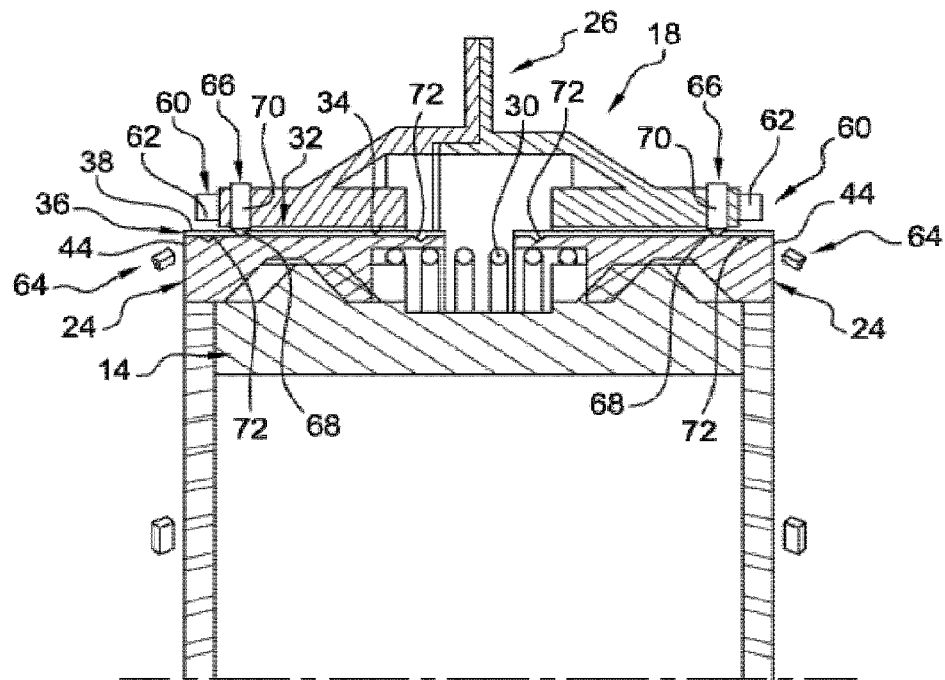
Figure 6C:
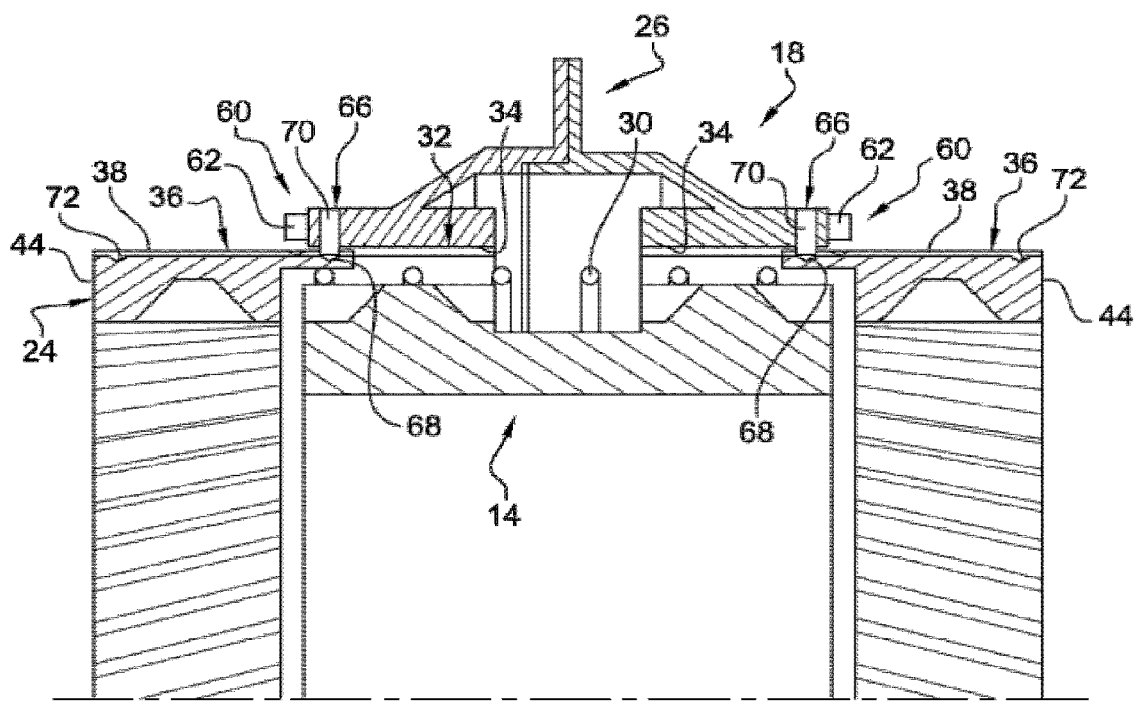

Thus, each half-ring gear 24 is slidably mounted with respect to the support plate 26 along a sliding direction parallel to the main axis of the speed reducer 10, between a coupled position, represented in particular in FIGS. 4A and 6A, in which both half-ring gears 24 are coupled with the planet gears 14 and an uncoupled position, represented in FIGS. 4C and 6C, in which the half-ring gears 24 are uncoupled from the planet gears 14.

When the half-ring gears 24 are in their coupled position, they are preferably axially abutting against each other or against an intermediate component of the support plate 26.

Each half-ring gear 24 is thus connected to the support plate 26 with a possible axial sliding with respect to the support plate 26.

The speed reducer 10 thus includes means for movably driving each half-ring gear 24 from the coupled position to the uncoupled position, the planet gears 14 exert the unclutching action on the half-ring gears 24 and retaining means for retaining each half-ring gear in the coupled position when the planet gears 14 exert an action on each half-ring gear 24 the amplitude of which is lower than the predefined amplitude value.

The movable driving of each half-ring gear 24 from the coupled position to the uncoupled position is made by the action of the planet gears 14 on the half-ring gear 24. Indeed, as previously mentioned, because of the cooperation of the complementary helical teeth of each half-ring gear 24 and the planet gears 14, the planet gears 14 exert on each half-ring gear 24 an action being decomposed in a force tangentially oriented with respect to the main axis of the speed reducer 10, a force axially oriented that is parallel to the main axis of the speed reducer 10 and a force radially oriented with respect to the main axis of each planet gear 14.

Depending on the orientation of the teeth and depending on the direction of the action exerted by the planet gears 14 on each half-ring gear 24, the axial force is oriented either inwardly of the ring gear 18, or outwardly of the ring gear 18 upon operating the turbomachine.

Consequently, when the action exerted by the planet gears 14 on each half-ring gear 24 results in that this axial force is oriented outwardly of the ring gear 18, (and higher than the predefined value for a fuse break), this axial force enables each half-ring gear 24 to be driven to its uncoupled position.

According to an alternative embodiment, and as can be seen in more detail in the figures, the speed reducer 10 includes further means for axially movably driving the half-ring gears 24 to the uncoupled position.

Here, these further means include a helical spring 30 which is axially compressed between each half-ring gear 24 and an abutting portion for abutting the support plate 26.

Each spring 30 permanently exerts a force on the associated half-ring gear 24 which is parallel to the main axis of the speed reducer 10 and oriented outwardly of the ring gear 18, that is in the direction of the uncoupled position.

This further force exerted by the spring enables in particular the movement of the half-ring gear 24 to be speed up to the uncoupled position.

The connection of each half-ring gear 24 with the support plate 26 is made to rotatably lock the half-ring gears 24 with respect to the support plate 26 about the main axis of the speed reducer 10, while enabling the half-ring gears 24 to be axially moved.

To that end, the support plate 26 includes splines 32 distributed on its inner peripheral face 34, which cooperate with complementary splines 36 distributed on the outer peripheral face 38 of each half-ring gear 24.

It will be understood that the invention is not limited to this embodiment and that each half-ring gear 24 can be connected to the support plate 26 by any other means as for example through at least one assembly including a keyway and an associated key.

The speed reducer 10 includes retaining means for retaining each half-ring gear 24 in its coupled position.

These retaining means are made in order to maintain each half-ring gear 24 in the coupled position when the speed reducer 10 is under normal operating conditions and not to retain the half-ring gears 24 any longer when a blocking in the low pressure line occurs.

According to the embodiments represented in the figures, the retaining means include at least one element which is able to be deformed when the planet gears exert on each half-ring gear 24 the unclutching action. This deformation of the retaining element can consist of an elastic deformation, a plastic deformation or an element break.

According to the embodiment represented in FIGS. 3 to 4C, the retaining means include a rod 40 oriented parallel to the main axis of the speed reducer 10, which extends axially so as to pass simultaneously through both half-ring gears 24. Each half-ring gear 24 includes an axial through port 54 in which the rod 40 is received.

The rod 40 extends axially beyond the half-ring gears 24, that is each end 42 of the rod 40 axially projects from one of both half-ring gears 24, beyond an axial end face 44 of the half-ring gear 24, which is located axially outwardly of the ring gear 18, when the half-ring gears 24 are in their coupled position.

The rod 40 thus includes an intermediate segment 46 associated with each half-ring gear 24 which carries the element to be deformed.

This element consists of an abutting member 48 which is abutting against the axial end face 44 of the associated half-ring gear 24, and which maintains the associated half-ring gear 24 in its coupled position.

The abutting member 48 is designed to be deformed when the half-ring gear 24 associated therewith undergoes from the planet gears 14 a high enough axial force, which corresponds to the unclutching action.

Herein, the abutting member 48 consists of a stop ring which is able to be permanently deformed, that is it is able to be plastically deformed.

According to an alternative embodiment, the abutting member 48 consists of an elastic washer which is received in an associated groove formed in the intermediate segment 46 of the rod 40. The abutting member is thus able to be elastically deformed to come out of the groove when the action causing the movement of the half-ring gears 24 is exerted.

Once the abutting member 48 is deformed, the half-ring gear 24 associated therewith can then be moved to its uncoupled position under the action in particular of the planet gears 14, as has been previously described.

The rod 40 thus includes thrust bearing means 50 against which each half-ring gear 24 bears when it reaches its uncoupled position.

These thrust bearing means 50 are carried by each end 42 of the rod 42 and each consist of a washer 52 received in an associated groove formed in the associated end of the rod 50.

Each thrust bearing means 50 is able to axially abut against the half-ring gear 24.

Herein, each thrust bearing means 50 is able to abut against a shoulder 56 formed in the port 54 of the associated half-ring gear 24. This embodiment enables the axial length of the rod 40 to be limited and thus the total axial bulk of the speed reducer 10 to be limited.

Thus, by virtue of this abutment of each bearing means 50 against a shoulder, the half-ring gears 24 remain connected to the support plate 26, even after being uncoupled from the planet gears 14, which thus makes it possible to avoid that they are ejected and can break another element.

According to an alternative embodiment (not represented), each thrust bearing means 50 is able to abut against the axial end face 44 of the associated half-ring gear 24.

In the embodiment just described, the retaining means include a single rod 40 passing through both half-ring gears 24.

It will be understood that the invention is not limited to this embodiment and that the speed reducer 10 can include a plurality of rods 40 similar to that just described, which are evenly distributed about the main axis of the speed reducer 10 and which all cooperate with both half-ring gears 24 in the same way, to maintain the half-ring gears 24 in the coupled position upon normally operating the speed reducer 10 and to enable the half-ring gears 24 to be moved to their uncoupled position in the case of a force on the half-ring gears 24 the amplitude of which is significant.

Thus, as can be seen in FIG. 4A, when the speed reducer 10 is under a normal operating condition, the half-ring gears 24 are in their axial position coupled with the planet gears 14. The action of the planet gears 14 onto the half-ring gears 24 comprises an axial force the value of which is lower than the previously predefined amplitude value.

The orientation of the action exerted by the planet gears 14 thus results either in maintaining each half-ring gear 24 axially abutting against the other half-ring gear 24, or to abut each half-ring gear 24 against the abutting member 48 associated therewith and which is carried by the rod 40. Since the amplitude of the action is lower than the predefined amplitude, the abutting member 48 is not deformed, thus maintaining the half-ring gear 24 in its coupled position.

As can be seen in FIG. 4B, when the amplitude of the action exerted by the planet gears 14 on the half-ring gears becomes significant enough for this action to be an unclutching action, the abutting member 48 is deformed, thus enabling the half-ring gears 24 to be axially moved to their uncoupled position.

During its movement, each half-ring gear 24 is still coupled with the planet gears 14, which enables in particular the planet gears 14 to drive the half-ring gear 24 to its uncoupled position during the entire movement.

Finally, when each half-ring gear 24 reaches its uncoupled position represented in FIG. 4C, the half-ring gears 24 are no longer coupled with the planet gears 14, thus providing the mechanical fuse function in the speed reducer 10.

In this position, each washer 52 of the thrust bearing means 50 is abutting against the shoulder 56 formed in the port 54 of the associated half-ring gear 24.

The springs 30 further enable the half-ring gears 24 to be maintained in their uncoupled position, thus avoiding any unwanted meshing of the half-ring gears 24 with the planet gears 14.

In FIGS. 5, 6A to 6C, another embodiment of the speed reducer has been represented, in which the retaining means include at least one fusible thrust bearing 60 associated with each half-ring gear 24 and against which each half-ring gear 24 is axially abutting outwardly of the ring gear 18 when the half-ring gear 24 is in its coupled position.

Preferably, the retaining means include a plurality of fusible thrust bearings 60 evenly distributed about the main axis of the speed reducer 10.

Each fusible thrust bearing 60 is carried by the support plate 26 and is abutting against the axial end face 44 of the associated half-ring gear 24. It includes an attachment portion 62 for attaching the fusible thrust bearing 60 to the support plate 26 and an abutment portion 64 for abutting the fusible thrust bearing 60 against said axial end face 44 of the half-ring gear 24.

Both portions 62, 64 of the fusible thrust bearing 60 are connected to each other by a portion with a low breaking strength which is able to be ruptured when the planet gears 14 exert on the half-ring gears 24 said unclutching action.

When the portion with a low breaking strength of the fusible thrust bearing 60 has been ruptured, the abutment portion 64 has been unsecured from the attachment portion 62, the half-ring gear 24 associated with the fusible thrust bearing 60 is thereby no longer axially retained in the coupled position, thereby it can be moved to the uncoupled position.

The retaining means also include a ball thrust bearing system 66 associated with each half-ring gear 24 and which is made to maintain the associated half-ring gear 24 in each of the coupled position or the uncoupled position.

Here, the ball thrust bearing system 66 includes a ball 68 which is carried by the support plate 26 and which is radially movably mounted, with respect to the main axis of the speed reducer, with respect to the support plate 26.

The ball 68 is movably guided with respect to the support plate 26 by a guiding cylinder 70 radially oriented with respect to the main axis of the speed reducer 10 which is mounted in an associated radial port formed in the support plate 26. A compression spring is arranged in the guiding cylinder to force the ball 68 to a deployed position.

Each half-ring gear 24 includes two cavities 72 with either of which the ball 68 is to cooperate when the half-ring gear 24 is in either of the coupled position or the uncoupled position.

Here, according to a preferred embodiment, both cavities 72 are formed in the bottom of a recessed groove in the spline 36 of the half-ring gear 24 and the ball 68, the guiding cylinder 70 and the abutment spring are carried by a tooth of the associated spline 32 belonging to the support plate 26.

Thus, as can be seen in FIG. 6A, when the speed reducer 10 is under normal operating conditions, each half-ring gear 24 is in its coupled position. The amplitude of the action exerted by the planet gears 14 on the half-ring gears 24 is lower than the previously mentioned predefined amplitude value.

Each ball 68 is further received in a cavity 72 which corresponds to the coupled position.

The orientation of the action exerted by the planet gears 14 thus results either in maintaining each half-ring gear 24 axially abutting against the other half-ring gear 24, or in abutting each half-ring gear 24 against the fusible thrust bearing 60 associated therewith. The amplitude of the action being lower than the predefined amplitude, the fusible thrust bearing 60 is not ruptured, thus maintaining the half-ring gear 24 in its coupled position.

Moreover, the ball thrust bearing 66 cooperates with the fusible thrust bearing 60 to maintain the half-ring gear 24 in its coupled position.

As can be seen in FIG. 6B, when the amplitude of the action exerted by the planet gears 14 on the half-ring gears becomes significant enough for this action to be an unclutching action, the portion with a low strength of each fusible thrust bearing 60 ruptures and each ball 68 comes out of the associated cavity, thus enabling the half-ring gears 24 to be axially moved to their uncoupled position.

During this movement, each half-ring gear 24 is still coupled with the planet gears 14, which enables in particular the planet gears 14 to drive the half-ring gears 24 to their uncoupled position during this entire movement.

Finally, when each half-ring gear 24 reaches its uncoupled position represented in FIG. 4C, the half-ring gears 24 are no longer coupled with the planet gears 14, in order to ensure the mechanical fuse function in the speed reducer 10.

In this position, the balls 68 are received in the associated second cavities 72, which enables, in association with the springs 30, the half-ring gears 24 to be maintained in their uncoupled position, thus avoiding any unwanted meshing of the half-ring gears 24 with the planet gears 14.

Regardless of the embodiment of the speed reducer 10, when the half-ring gears 24 are in their coupled position, they are attached to the support plate 26 through the splines 32, 36 and the retaining means.

Consequently, the different components of the ring gear 18 form a rigid sub-assembly. Therefore, there is no flexibility induced by the mechanical fuse function in the speed reducer 10.

In addition, most of the components enabling this mechanical fuse function to be ensured in the speed reducer 10 are incorporated to the components of the ring gear, either in the half-ring gears 24 or in the support plate 26.

As a result in normal operation, the total bulk of the speed reducer 10 is only slightly increased with respect to the bulk of a conventional speed reducer not including the mechanical fuse function.

The invention claimed is:

1. A speed reducer, comprising:
an annular ring gear coaxial to a main axis of the speed reducer and having radially inner teeth,
at least one gear which is coupled with the ring gear and which includes radially outer teeth complementary to the teeth of the annular ring gear,
wherein the ring gear includes two annular half-ring gears offset with respect to each other along the main axis of the speed reducer and which are coupled with said at least one gear, and a support plate for supporting both half-ring gears, with respect to which both half-ring gears are rotatably immovable about the main axis of the speed reducer, each half-ring gear including helical inner teeth tilted in a direction opposite to the tilt direction of the teeth of the other half-ring gear,
wherein each half-ring gear is connected to the support plate so as to be able to be uncoupled from said at least one gear when said at least one gear exerts on each half-ring gear an unclutching action the amplitude of which is higher than a determined amplitude value,
wherein each half-ring gear is slidably mounted with respect to the support plate, along a direction parallel to the main axis of the speed reducer, between a coupled position in which said half-ring gear is coupled with said at least one gear and an uncoupled position in which said half-ring gear is uncoupled from said at least one gear, and
wherein the speed reducer includes retaining means, for retaining said half-ring gear in its coupled position, said retaining means, being able to be disengaged to enable said half-ring gear to be moved to the uncoupled position when said at least one gear exerts on each half-ring gear said unclutching action.

2. The speed reducer according to claim 1, wherein the retaining means include at least one abutting member associated with each half-ring gear, which axially abuts against an abutting face of the half-ring gear associated therewith, and which is able to change state when said at least one gear exerts on the half-ring gear said unclutching action.

3. The speed reducer according to claim 2, wherein the abutting member includes a deformable stop ring associated with each half-ring gear, which abuts against said abutting face of the half-ring gear associated therewith and which is carried by a rod oriented parallel to the main axis of the speed reducer and which passes through an axial port made in both half-ring gears.

4. The speed reducer according to claim 3, wherein the retaining means include a thrust bearing member associated with each half-ring gear, which is able to cooperate with the associated half-ring gear when it is in its uncoupled position, and
wherein the thrust bearing member includes a washer received in an associated groove formed in one end of the rod associated with said half-ring gear.

5. The speed reducer according to claim 2, wherein the abutting member includes a fusible thrust bearing which is able to be ruptured when said at least one gear exerts on the half-ring gear said action.

6. The speed reducer according to claim 5, wherein the fusible thrust bearing includes an attachment portion for attaching the fusible thrust bearing to the support plate and an abutting portion for abutting the fusible thrust bearing against said abutting face of the half-ring gear.

7. The speed reducer according to claim 5,
wherein the retaining means include a thrust bearing member associated with each half-ring gear, which is able to cooperate with the associated half-ring gear when it is in its uncoupled position, and
wherein the thrust bearing member includes at least one ball thrust bearing arranged in a spline of the support plate, which is able to cooperate with the associated half-ring gear when it is in one of the uncoupled position and the coupled position.

8. The speed reducer according to claim 1, wherein the retaining means include a thrust bearing member associated with each half-ring gear, which is able to cooperate with the associated half-ring gear when it is in its uncoupled position.

9. The speed reducer according to claim 1, wherein each half-ring gear is movably driven to its uncoupled position through the axial force resulting from the action of said at least one gear on the helical teeth of the half-ring gear.

10. The speed reducer according to claim 9, further comprising driving means for movably driving each half-ring gear to its uncoupled position.

11. The speed reducer according to claim 10, wherein said driving means include a compression spring which is axially compressed between both half-ring gears.

12. The speed reducer according to claim 1, comprising a planetary gearset type reducer and wherein said ring gear is the outer annular ring gear of the gearset and said at least one gear includes a plurality of planet gears connected to each other by a planet carrier.

13. An aircraft turbomachine comprising:
a low pressure turbine, a low pressure shaft which is coupled with the low pressure turbine and a fan which is coupled with the low pressure shaft, and the speed reducer according to claim 1, through which the fan is coupled with the low pressure shaft.

14. The speed reducer according to claim 1, wherein the speed reducer is configured to transmit torque between a gas turbine and a fan in a turbomachine.

\* \* \* \* \*